United States Patent Office 3,214,391
Patented Oct. 26, 1965

3,214,391
ORGANOSTANNOXY ALUMINOXANE POLYMERS AND COPOLYMERS AND THE PROCESS OF MAKING SAME
John B. Rust and Genevieve C. Denault, Los Angeles, Calif., assignors to Hughes Aircraft Company, Culver City, Calif., a corporation of Delaware
No Drawing. Filed June 27, 1960, Ser. No. 38,738
20 Claims. (Cl. 260—2)

The present invention relates to stannoxy-aluminoxane and stannoxy stannoaluminoxane polymers of outstanding thermal stability and especially to such polymers and copolymers having organosubstituted stannoxy side groups, and to the process of making same.

Aluminoxane polymers have been described in the prior art which have been produced by the careful hydrolysis of aluminum esters to form polymers having the structure:

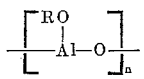

where the R groups are alkyl, aryl and the like. However, the RO groups of these polymers are easily subjected to further hydrolysis to yield crosslinked materials and to finally yield aluminum oxide itself. In fact, even during the careful hydrolysis step required to prepare the initial polymer, extensive crosslinking occurs because of the equivalent reactivity of each of the RO groups and of the randomness of the hydrolysis process. Still other disclosures have been made of aluminoxane polymers where the R group in the above formula is an R'CO group produced by reacting a carboxylic acid with an aluminum ester. Here again the R'COO group is easily removed from the polymer by hydrolysis and the polymer is not stable at high temperatures. Disclosures of still other aluminoxane polymers have been made in which the polymers are produced from mixed aluminum esters. The same deficiencies exist with these polymers, however, as with those described above.

It is an important object of this invention to provide organostannoxyaluminoxane polymers and copolymers of controlled structure and outstanding thermal stability.

Another object of this invention is to provide a method for making aluminoxane polymers and copolymers having organo-substituted stannoxy side groups.

A further object of this invention is to provide a group of resinous compositions of controlled structure and molecular weight and reproducible thermal and mechanical properties.

The present invention is primarily concerned with our discovery that the grouping Sn—O—Al can be secured by certain synthetic methods and that this same grouping possesses great thermal stability. We have, furthermore, found that certain synthetic reactions lead to the formation of high polymers containing the Sn—O—Al grouping. These high polymers are capable of being utilized in compositions which may be used for the fabrication of components. These components possess a range of usefulness in electronic parts in systems which must operate in unnatural environments, such as high thermal flux.

The polymers of this invention are prepared from well-defined intermediates or mixtures of intermediates. Some of these intermediates can be represented by the following general formula:

$$(R_3SnO)_nAl(OR')_{3-n}$$

and can conveniently be produced by the following general reaction:

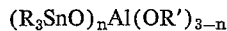
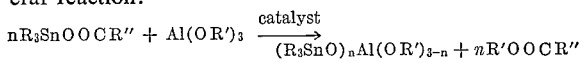

where $n$ equals 1, 2 or 3 and R and R' represent alkyl, aryl, aralkyl, alkaryl or mixed alkyl and aryl radicals. Thus R and R' can be methyl, ethyl, propyl, butyl, isopropyl, sec. butyl, hexyl, and the like; or phenyl, phenylene, naphthyl, diphenyl, ethylphenyl, and so forth; or benzyl, methyl-benzyl, α-phenyl ethyl, β-phenyl ethyl, α-phenylpropyl, and the like. The combination of R' and R'' should be such as to produce an ester R'OOCR'' which is substantially volatile and can be removed from the reaction medium, if desired, at reasonable temperatures and under normal or reduced pressures. Thus R' and R'' each should preferably contain less than about eight carbon atoms per radical. The intermediates represented by the above general formula are capable of participating in polymer formation if the value of $n$ is one or two. In the case where $n=3$ the compound is tris(triorganostannoxy) aluminane, and this material cannot, under normal circumstances, be used in the polymer forming reactions hereinafter described. However, under certain conditions of catalysis and stringest hydrolysis, partial cleavage of the stannoxy groups can be induced which then leads to resin formation. Where $n=2$ in in the general formula, the compound is bis(triorganostannoxy) alkoxy aluminane which functions as a chain stopper in the polymerization reactions. For the case where $n=1$, the intermediate yields linear polymers after appropriate reaction. Where a cross-linking agent is desired in the polymers of the present invention the aluminum ester itself is employed. For some purposes it is desirable to isolate the intermediates in a pure condition so that unequivocal polymer structure can be produced on further appropriate reaction. However, in certain practical utilizations of the polymers of this invention, they can be prepared directly by further reaction of the crude or unrefined mixtures of intermediates which result from the reaction indicated above. The use of such a mixture of intermediates results in a polymer whose structure can be conceived of as the statistical average of those structures proposed hereinafter. As an illustration: if one molar proportion of aluminum ester is reacted with one molar proportion of a triorgano acyloxy stannane, a small amount of unreacted starting material is to be expected along with the major product, triorganostannoxy dialkoxy aluminane. Small amounts of the two higher intermediates also are produced. Reaction of this mixture to form polymers and copolymers results in high molecular weight materials which are substantially linear in structure.

Although the above reaction is preferred for the preparation of the intermediates of this invention because of its ease of execution and substantially high yields, other methods can be employed. These other methods are not as generally applicable as the acyloxy-alkoxy reaction described above, but can be utilized in special cases. These other methods include the following type reactions:

(1) Alkoxy-halide; halide-alkoxy
(2) Acyloxy-halide; halide-acyloxy
(3) Sodium salt-halide
(4) Acyloxy-acyloxy
(5) Sodium salt-acyloxy
(6) Alkoxy-acyloxy where the first term above designates the substituents on the stannane and the second term, the substituents on the aluminane.

The intermediates described above can be polymerized by several methods to produce the polymers of the present invention. When purified intermediates are used, polymers of unequivocal structures are produced. When the unpurified intermediates are employed, polymers whose structure is the average over all postulated structures are obtained. Although the methods which we describe below are the preferred methods of producing the polymers of this invention, other procedures can be employed. Choosing the intermediate triorganostannoxydiisopropoxyaluminane as illustrative, the following series of reactions typify the methods of producing the polymers of this invention.

Method I: $R_3SnOAl(OC_3H_7)_2 + H_2O$ (water) $\longrightarrow$

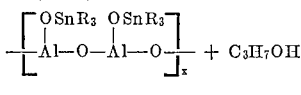
$+ C_3H_7OH$

Method II: $R_3SnOAl(OC_3H_7)_2 +$ 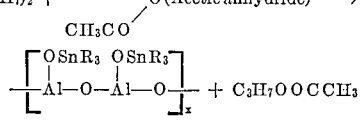 (Acetic anhydride) $\longrightarrow$

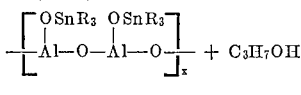
$+ C_3H_7OOCCH_3$

Method III: $R_3SnOAl(OC_3H_7)_2 + R'_3SnOAl(OOCCH_3)_2 \longrightarrow$

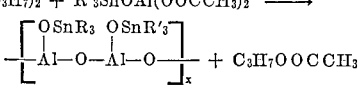
$+ C_3H_7OOCCH_3$

Method IV: $R_3SnOAl(OC_3H_7)_2 + R'_2Sn(OOCCH_3)_2 \longrightarrow$

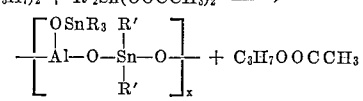
$+ C_3H_7OOCCH_3$ where $x$ is greater than unity and generally is quite high.

The use of Methods I and II yields stannoxyaluminoxane polymers as does also Method III, provided R and R' are the same radical. Copolymers are produced by using Methods III and IV. In the case of Method III side chain copolymers result when R' is a different radical than R, whereas with Method IV chain copolymers are obtained and R and R' can be the same or different radicals.

All of the above reactions, including those used to prepare the intermediates, can be carried out both with and without catalysts. When catalysts are not employed, the reactions are best conducted at elevated temperatures and, where the conditions warrant, under pressure in an autoclave. As catalysts for the reactions, alkali metal alcoholates have been shown to be effective, but other ester-interchange catalysts can also be employed.

By judicious choice of reaction conditions known to those skilled in the art, block copolymers or block polymers can be prepared by further reaction of the polymers described above with other polymeric materials having end groups reactable with the polymers of this invention. The stannoxyaluminoxane and stannoxystannoaluminoxane polymers of this invention are capable of forming linear polymers whose properties range from liquids to thermoplastic solids depending upon the degree of polymerization and upon the character of the triorganosubstituted stannoxy side chain. The polymers that have been described above are, in general, in this category. Trialkoxyaluminane can be used to produce crosslinked polymers. These crosslinked polymers can also be produced directly by hydrolysis according to Method I, or they can be produced as fusible polymers by Methods II, III, and IV and hydrolyzed later to yield crosslinked compositions. The latter compositions range from highly crosslinked solids useful as laminating, molding, and varnish resins to lightly crosslinked materials suitable for varnishes, embedding or elastomeric resins.

Polymers of the present invention can be used alone or in a mixture with fillers, and reinforcing agents, the proper choice depending upon the end use of the composition. As fillers, there can be used glass fibers, asbestos, clays, pigments such as iron oxide, zinc oxide, litharge, titanium dioxide, and so forth. Although the compositions of this invention can be advanced or cured by the application of heat, catalysts can be employed, such as metallic salts of carboxylic acids, quaternary ammonium salts, metallic oxides, organic peroxides, and the like.

The products of this invention which contain reactive end groups can be used to great advantage to prepare modifications of a variety of resinous materials of enhanced thermal properties, mechanical strength at elevated temperatures, weathering resistance and the like. The reactive end groups of our polymers are capable of reacting with alcohol and acid groups on resinous products, such as alkyd resins, phenolic hydroxyl groups, esters by interchange, drying oil fatty acids, silicone hydroxyl groups, amine groups, and epoxy groups as well as with many other reactive sites on other polymer molecules. By reacting with these resinous compositions, the polymers of this invention become a chemical part of the resinous composition, and thus impart desirable and unique properties to these modified compositions.

The following examples are given to illustrate the polymers and compositions of this invention as well as the process of making the intermediates, the polymers and copolymers and the uses of the materials. The examples are not to be construed as limiting the spirit and scope of this invention in any manner.

*Example 1*

To a three-necked flask fitted with a heating mantle, magnetic stirrer, thermometer, and reflux condenser was added 20.4 grams (0.1 mole) of aluminum triisopropoxide and 69.7 grams (0.2 mole) of tributylacetoxystannane. The mixture was heated with stirring for five hours. The mixture was cooled and sodium ethylate catalyst, made from 0.2 gram of metallic sodium and 4.0 grams of ethanol, was added. Heating was continued and the condenser set for distillation. Over a period of 8 hours, 20.2 grams of distillate were collected consisting essentially of isopropyl acetate. This amount was 99 percent of the theoretical quantity expected. The resulting bis(tributylstannoxy)isopropoxy aluminane was pale yellow and gelatinous in appearance.

*Example 2*

Five grams of the bis(tributylstannoxy)isopropoxy aluminane of Example 1 were dissolved in 25 ml. of toluene to form a pale colored, somewhat hazy, solution. The solution was heated under a reflux condenser with 20 ml. of water when a clear yellow solution resulted. Heating was continued for four hours. The water was removed in a separatory funnel and the solution dried. Upon removal of the solvent, a liquid product was obtained which had a tendency to crystallize on standing. The product essentially had the following structure:

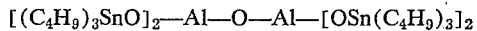

*Example 3*

To 58.5 grams of the bis(tributylstannoxy)isopropoxy aluminane of Example 1 in a flask equipped with stirrer and distillation condenser was added 13.5 grams of dibutyl diacetoxy stannane. There was a noticeable exothermic reaction when the ingredients were mixed. The mixture was heated with stirring and the isopropyl acetate distillate collected. A yellow waxy reaction product was obtained which was fusible and soluble in toluene.

This material essentially had a composition corresponding to the following formula:

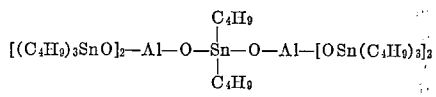

*Example 4*

To a three-necked flask containing 40.8 grams (0.2 mole) of aluminum isopropoxide was added 69.7 grams (0.2 mole) of tributyl acetoxy stannane. The flask was heated until a clear solution resulted, then cooled and sodium ethylate catalyst, made by dissolving 0.4 gram of metallic sodium in 5.8 grams of ethanol, was added. The flask was fitted with a distillation condenser and heated to remove the isopropyl acetate which was collected. The reaction product was heated under a 2 mm. vacuum to remove the last traces of isopropyl acetate. The reaction product, tributylstannoxy diisopropoxy aluminane, was a white, partially crystalline solid.

*Example 5*

A solution was formed of 10.0 grams of the tributylstannoxy diisopropoxy aluminane of Example 4 in 20 ml. of toluene. The solution was placed in a flask equipped with a stirrer along with 15 ml. of water. An exothermic reaction was noted and the solution increased slowly in viscosity.

A voluminous white, waxy material formed which was the polymer, stannoxy-aluminoxane.

*Example 6*

To 11.2 grams of the tributylstannoxy diisopropoxy aluminane (Example 4) dissolved in 20 ml. of toluene and placed in a flask fitted with a stirrer and distillation condenser was added 2.55 grams of acetic anhydride. An exothermic reaction occurred. The initially cloudy solution became clear as the reaction proceeded and heating was started one hour after mixing took place.

Isopropyl acetate was distilled along with the toluene leaving a pale colored stannoxyaluminoxane polymer.

*Example 7*

A one-molar proportion of the tributylstannoxy diisopropoxyaluminane of Example 4 was mixed with a one-molar proportion of dibutyl diacetoxystannane. A strong exothermic reaction resulted on mixing and the viscosity of the mixture increased rapidly, finally resulting in a cream-colored polymer which was fusible when heated in a direct flame. The polymer which was a stannoxy-stannoaluminoxane, showed outstanding thermal stability.

*Example 8*

To a three-necked flask was added 40.8 grams (0.2 mole) of aluminum isopropoxide and 69.7 grams (0.2 mole) of tributyl acetoxy stannane. The contents of the flask were heated until a homogeneous solution was obtained. After removal of the isopropyl acetate, the product was distilled. The tributylstannoxy diisopropoxy aluminane came over as a colorless, viscous fluid, having a boiling point of 96–99° C./1 mm. and a refractive index $N_D^{25}$ 1.4639.

What is claimed is:

1. A process for producing a triorganostannoxy substituted aluminum compound having the general formula $(R_3SnO)_nAl(OR')_{3-n}$ comprising reacting a tris(alkoxy) aluminum having the general formula $(R'O)_3Al$ with a triorgano-acyloxy stannane having the general formula $R_3SnOOCR''$, wherein R is a hydrocarbon radical selected from the class consisting of alkyl, aryl, aralkyl and alkaryl, wherein R' and R'' are hydrocarbon alkyl radicals and $n$ takes an integral value in the range of about 1 to 3.

2. A process for producing a triorganostannoxy aluminum compound having the general formula $$(R_3SnO)_nAl(OR')_{3-n}$$

comprising reacting an aluminum trialkoxide having the general formula $(R'O)_3Al$ with a triorgano acyloxy stannane having the general formula $R_3SnOOCR''$ in the presence of a sodium alkoxide catalyst, wherein R is a hydrocarbon radical selected from the class consisting of alkyl, aryl, aralkyl and alkaryl, wherein R' and R'' are hydrocarbon alkyl radicals and $n$ takes an integral value in the range of about 1 to 3.

3. A triorganostannoxy aluminum compound having the general formula $(R_3SnO)_nAl(OR')_{3-n}$ wherein R is a hydrocarbon radical selected from the class consisting of alkyl, aryl, aralkyl and alkaryl, wherein R' is a hydrocarbon alkyl radical and $n$ takes an integral value in the range of about 1 to 3.

4. A process for the production of triorganostannoxy substituted aluminum oxide polymer comprising reacting by organic ester elimination a triorganostannoxy alkoxy aluminum compound having the general formula $$(R_3SnO)Al(OR')_2$$

with a compound selected from the group consisting of organic acid anhydride and triorganostannoxy acyloxy aluminum derivative having the general formula $$(R_3''SnO)Al(OOCR''')_2$$

wherein R and R'' are hydrocarbon radicals selected from the class consisting of alkyl, aryl, aralkyl, and alkaryl, and wherein R' and R''' are hydrocarbon alkyl radicals.

5. A triorganostannoxy aluminum oxide polymer produced by the process of claim 4.

6. A process for the production of triorganostannoxy substituted aluminum oxide-organotin oxide polymer comprising reacting by organic ester elimination a triorganostannoxy alkoxy aluminum compound having the general formula $(R_3SnO)Al(OR')_2$ with an organotin acylate having the general formula $R''_mSn(OOCR''')_{4-m}$ wherein R and R'' are hydrocarbon radicals selected from the class consisting of alkyl, aryl, aralkyl, and alkaryl, wherein R' and R''' are hydrocarbon alkyl radicals and $m$ takes an integral value in the range of about 1 to 3.

7. A triorganostannoxy aluminum oxide-organotin oxide polymer produced by the process of claim 6.

8. Bis(tributylstannoxy) isopropoxy aluminane.

9. The process of producing bis(tributylstannoxy) isopropoxy aluminane comprising reacting tributyl acetoxy stannane and aluminum triisopropoxide in the presence of sodium-ethoxide catalyst.

10. Tributylstannoxy diisopropoxy aluminane.

11. The process of producing tributylstannoxy diisopropoxy aluminane comprising reacting tributyl acetoxy stannane and aluminum triisopropoxide in the presence of sodium ethoxide catalyst.

12. A tributylstannoxy aluminum oxide having the general formula $$[(C_4H_9)_3SnO]_2-Al-O-Al[OSn(C_4H_9)_3]_2$$

13. The process of producing a tributylstannoxy aluminum oxide having the general formula $$[(C_4H_9)_3SnO]_2-Al-O-Al[OSn(C_4H_9)_3]_2$$

comprising reacting bis(tributylstannoxy) isopropoxy aluminane with water.

14. The process of producing triorganostannoxy substituted aluminum oxide polymer comprising reacting by organic alcohol elimination tributylstannoxy diisopropoxy aluminane with water.

15. A triorganostannoxy aluminum oxide polymer comprising the reaction product of tributylstannoxy dissopropoxy aluminane with acetic anhydride.

16. The process of producing triorganostannoxy substituted aluminum oxide-organotin oxide polymer comprising reacting by organic ester elimination tributylstannoxy diisopropoxy aluminane with dibutyl diacetoxy stannane.

17. A triorganostannoxy substituted aluminum oxide-organotin oxide polymer comprising the reaction product of tributylstannoxy diisopropoxy aluminane with dibutyl diacetoxy stannane.

18. A tributylstannoxy aluminum oxide-dibutyl tin oxide having the general formula $$[(C_4H_9)_3SnO]_2-Al-O-\underset{\underset{C_4H_9}{|}}{\overset{\overset{C_4H_9}{|}}{Sn}}-O-Al-[OSn(C_4H_9)_4]_2$$

19. The process of producing a tributylstannoxy aluminum oxide-dibutyl tin oxide having the general formula

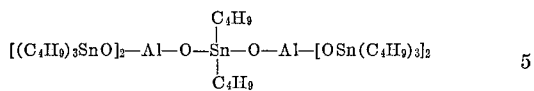

comprising reacting bis(tributylstannoxy) isopropoxy aluminane with dibutyl diacetoxy stannane.

20. A process for the production of a triorganostannoxy substituted aluminum oxide polymer comprising reacting by organic alcohol elimination a triorganostannoxy alkoxy aluminum compound having the general formula $(R_3SnO)Al(OR')_2$ with water, wherein R is a hydrocarbon radical selected from the class consisting of alkyl, aryl, aralkyl, and alkaryl, and R' is a hydrocarbon alkyl radical.

References Cited by the Examiner
UNITED STATES PATENTS

| | | | |
|---|---|---|---|
| 2,592,926 | 4/52 | Mack | 260—2 |
| 2,670,303 | 2/54 | Mailander | 260—2 |
| 2,998,407 | 8/61 | Foster et al. | 260—2 |

WILLIAM H. SHORT, *Primary Examiner.*

MILTON STERMAN, HAROLD N. BURSTEIN, JOSEPH R. LIBERMAN, *Examiners.*

UNITED STATES PATENT OFFICE
CERTIFICATE OF CORRECTION

Patent No. 3,214,391                                          October 26, 1965

John B. Rust et al.

It is hereby certified that error appears in the above numbered patent requiring correction and that the said Letters Patent should read as corrected below.

Column 6, line 30, for "3" read -- 2 --; line 74, for that portion of the formula reading $$(C_4H_9)_4]_2 \quad \text{read} \quad (C_4H_9)_3]_2$$

Signed and sealed this 9th day of August 1966.

(SEAL)
Attest:

ERNEST W. SWIDER
Attesting Officer

EDWARD J. BRENNER
Commissioner of Patents